(12) United States Patent
Hausmann

(10) Patent No.: US 9,353,780 B2
(45) Date of Patent: May 31, 2016

(54) DEVICE FOR CONNECTING TWO PARTS AND NEEDLE SYSTEM FOR SUCH A DEVICE

(76) Inventor: Thomas Hausmann, Hann. Münden (DE)

( * ) Notice: Subject to any disclaimer, the term of this patent is extended or adjusted under 35 U.S.C. 154(b) by 174 days.

(21) Appl. No.: 14/235,389

(22) PCT Filed: Jul. 17, 2012

(86) PCT No.: PCT/EP2012/063985
§ 371 (c)(1),
(2), (4) Date: Jan. 27, 2014

(87) PCT Pub. No.: WO2013/014027
PCT Pub. Date: Jan. 31, 2013

(65) Prior Publication Data
US 2015/0159685 A1    Jun. 11, 2015

(30) Foreign Application Priority Data

Jun. 27, 2011  (DE) .......................... 10 2011 108 624

(51) Int. Cl.
*F16B 13/04*  (2006.01)
*F16B 5/06*   (2006.01)
*F16B 19/10*  (2006.01)
*B25B 31/00*  (2006.01)

(52) U.S. Cl.
CPC ............. *F16B 5/0621* (2013.01); *B25B 31/005* (2013.01); *F16B 19/109* (2013.01)

(58) Field of Classification Search
CPC ...... F16B 5/0621; F16B 19/109; F16B 13/04; B25B 31/005
USPC .................................... 411/24–26, 75, 77, 78
See application file for complete search history.

(56) References Cited

U.S. PATENT DOCUMENTS

| | | | | |
|---|---|---|---|---|
| 2,430,486 A | * | 11/1947 | Sittert | B25B 31/005 269/48.4 |
| 2,463,700 A | * | 3/1949 | Kostrubanic, Jr. | F16B 19/109 269/48.4 |
| 2,463,731 A | * | 3/1949 | Whalen | F16B 19/109 269/48.4 |
| 3,233,504 A | * | 2/1966 | Jones | B25B 31/005 269/48.3 |
| 4,537,542 A | * | 8/1985 | Pratt | B25B 31/005 24/607 |
| 4,548,533 A | * | 10/1985 | Pratt | F16B 19/109 24/607 |
| 5,240,361 A | * | 8/1993 | Armstrong | F16B 19/109 269/48.2 |
| 7,070,375 B2 | * | 7/2006 | Hoeckelman | F16B 19/109 269/48.1 |
| 7,596,846 B2 | * | 10/2009 | Hoeckelman | F16B 19/109 116/259 |

FOREIGN PATENT DOCUMENTS

| | | |
|---|---|---|
| DE | 24 41 577 A1 | 3/1975 |
| DE | 10 2011 118 872 A1 | 11/2012 |
| GB | 1 478 647 A | 7/1977 |

* cited by examiner

*Primary Examiner* — Roberta Delisle
(74) *Attorney, Agent, or Firm* — Maschoff Brennan

(57) ABSTRACT

The invention relates to a device to connect two parts, which is characterized by at least two needles which are connected on a base side to separate carriers, of which at least one carrier is operatively connected to the drive element for adjusting the needles, wherein in an initial position of the needles the needle tip are axially displaced with respect to one another and in a bracing position the needle tips are opposite one another in such a way that the supporting areas thereof are situated at the same axial level. The needles have in the region of their tips relative to their mutually facing areas integrated elevations and depressions in order to thereby control the spreading of the needle tips when the needles are actually displaced with respect to one another.

23 Claims, 11 Drawing Sheets

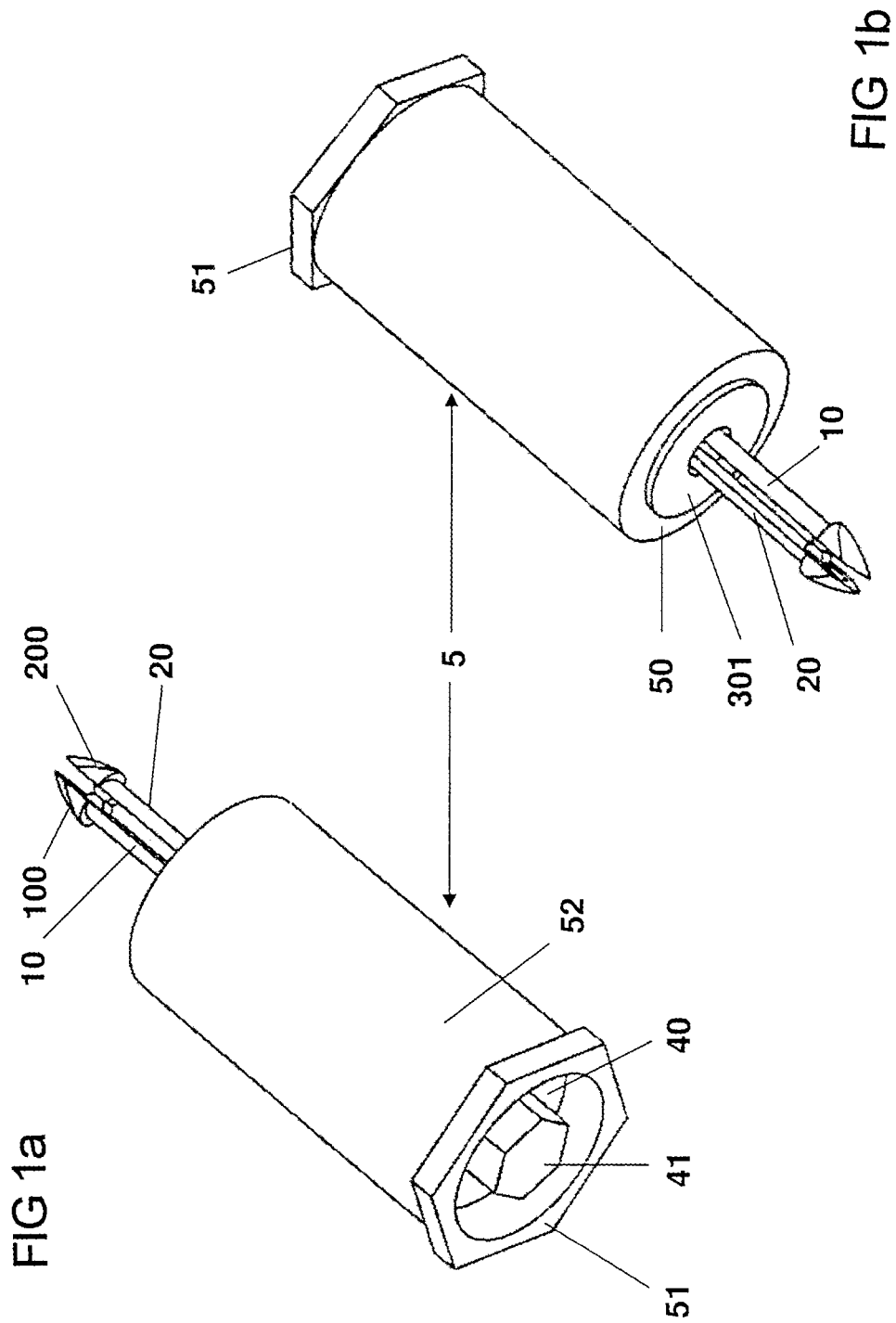

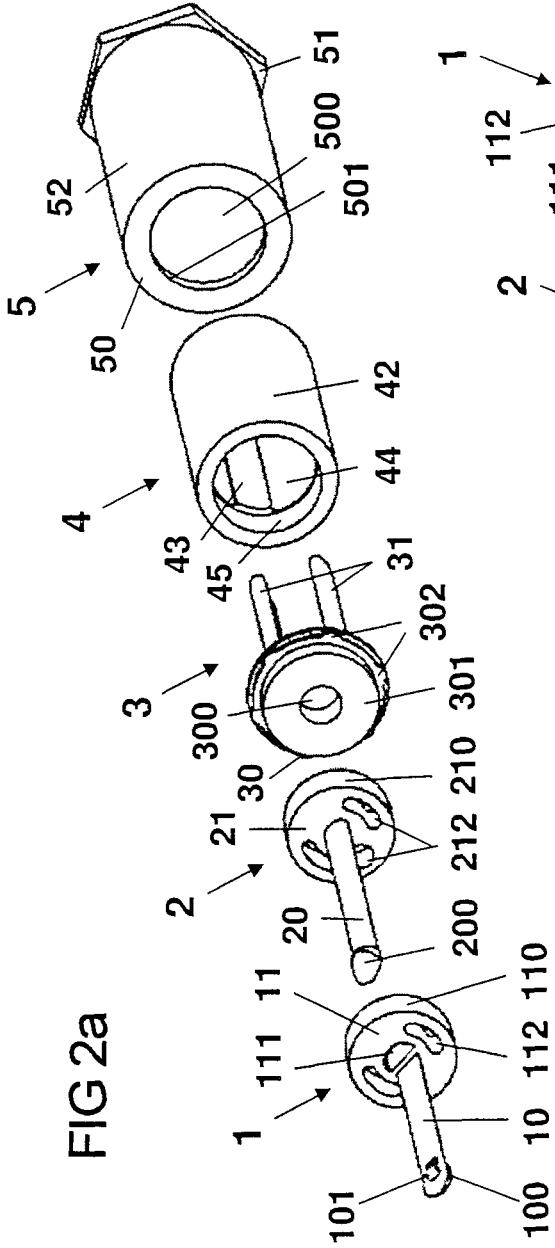
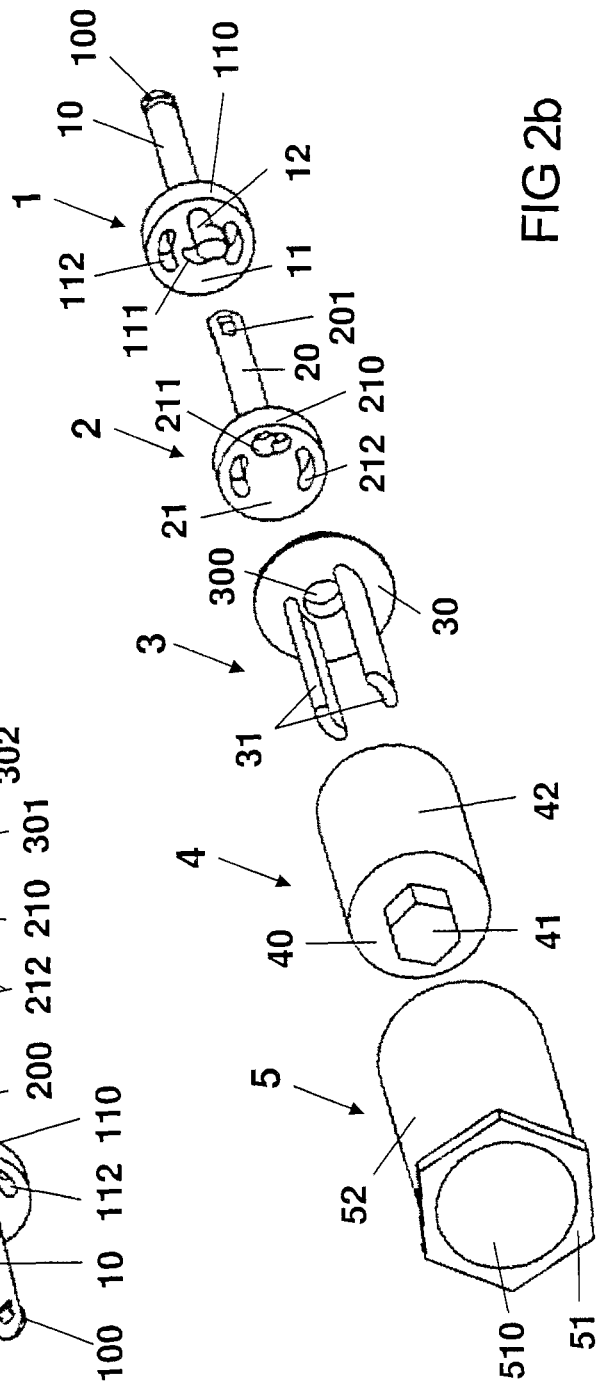

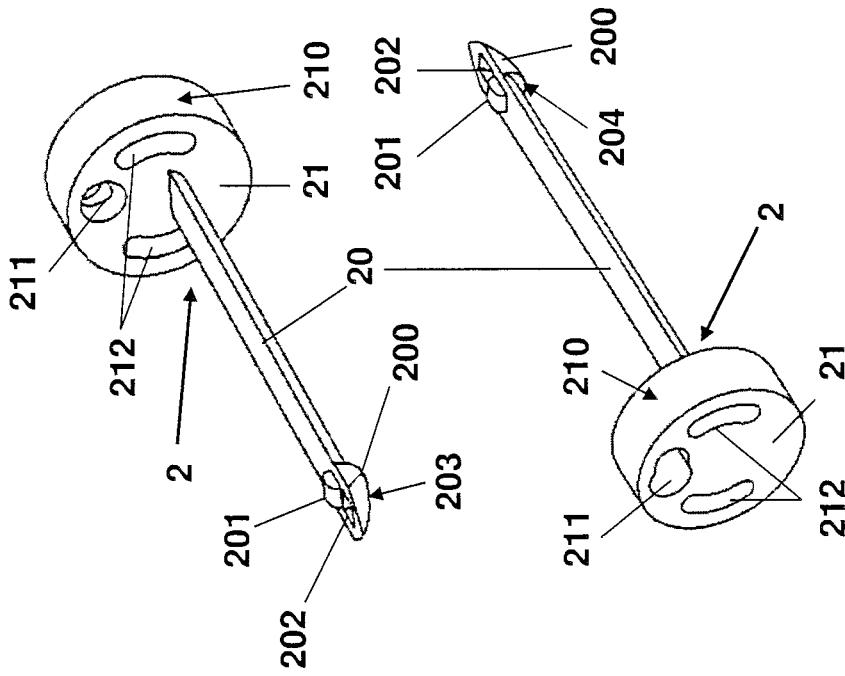

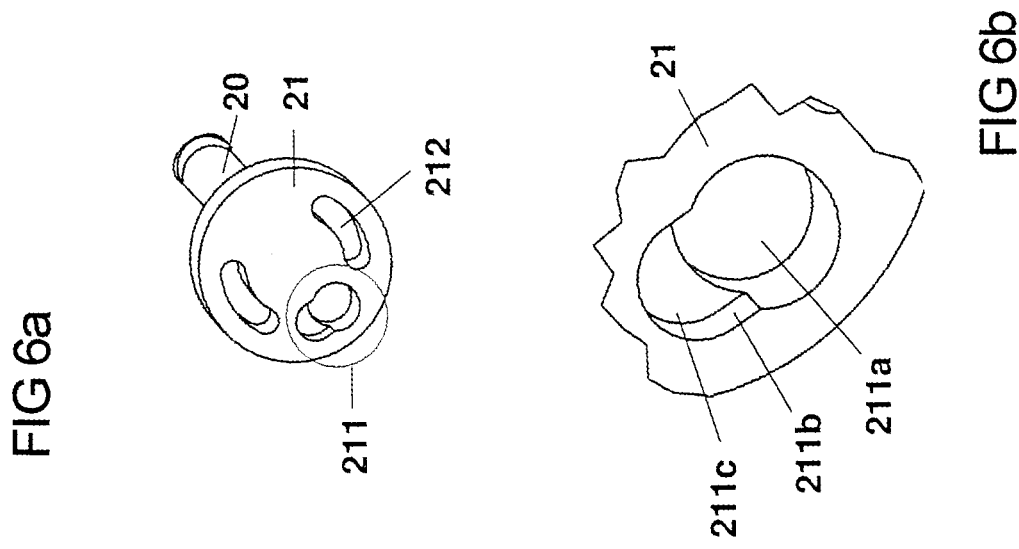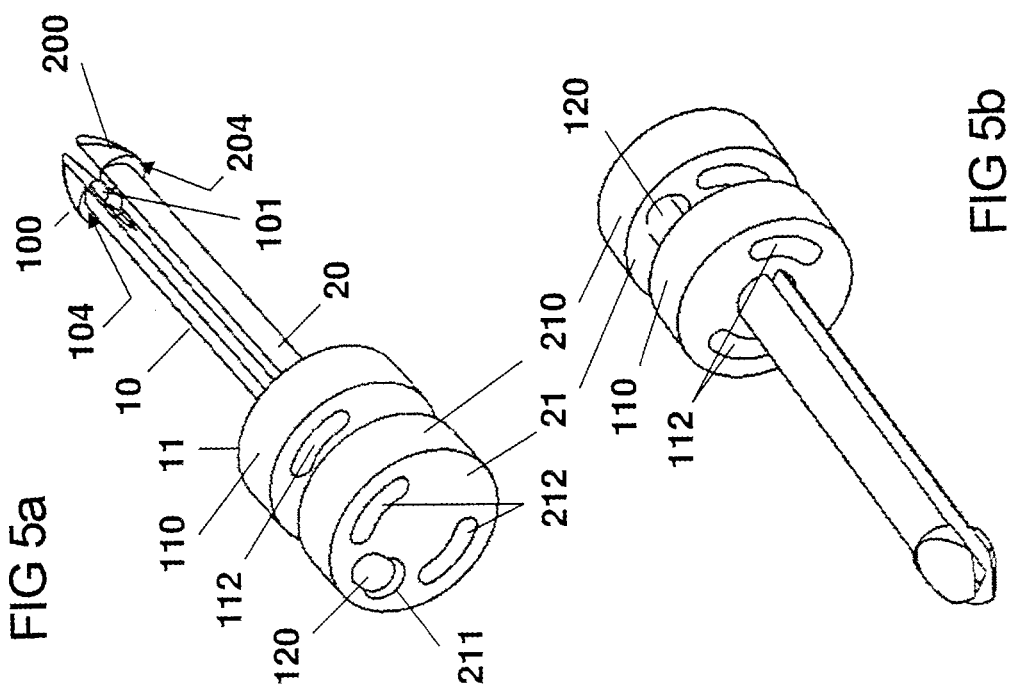

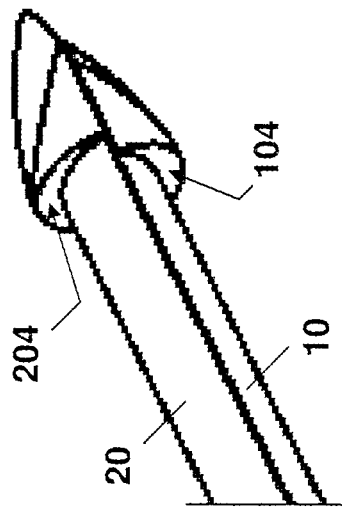
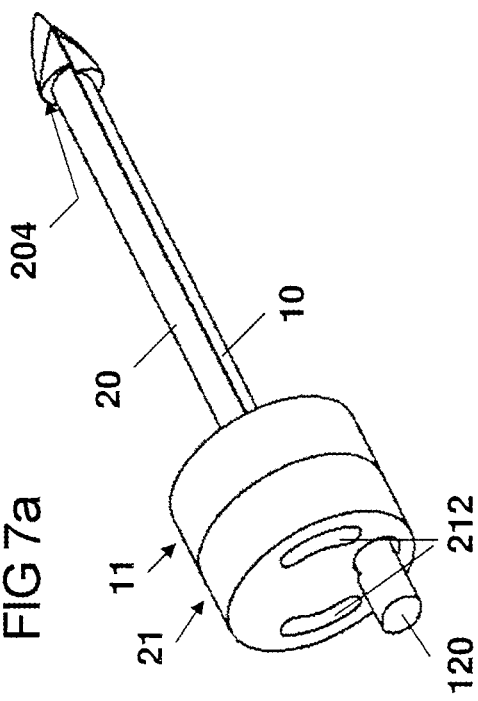
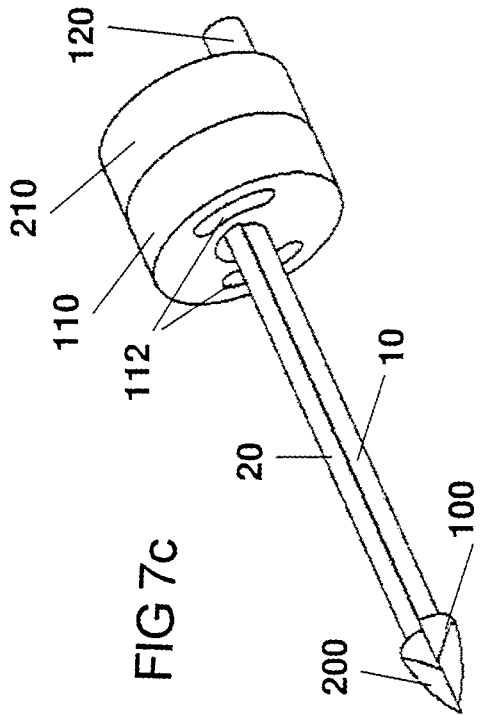

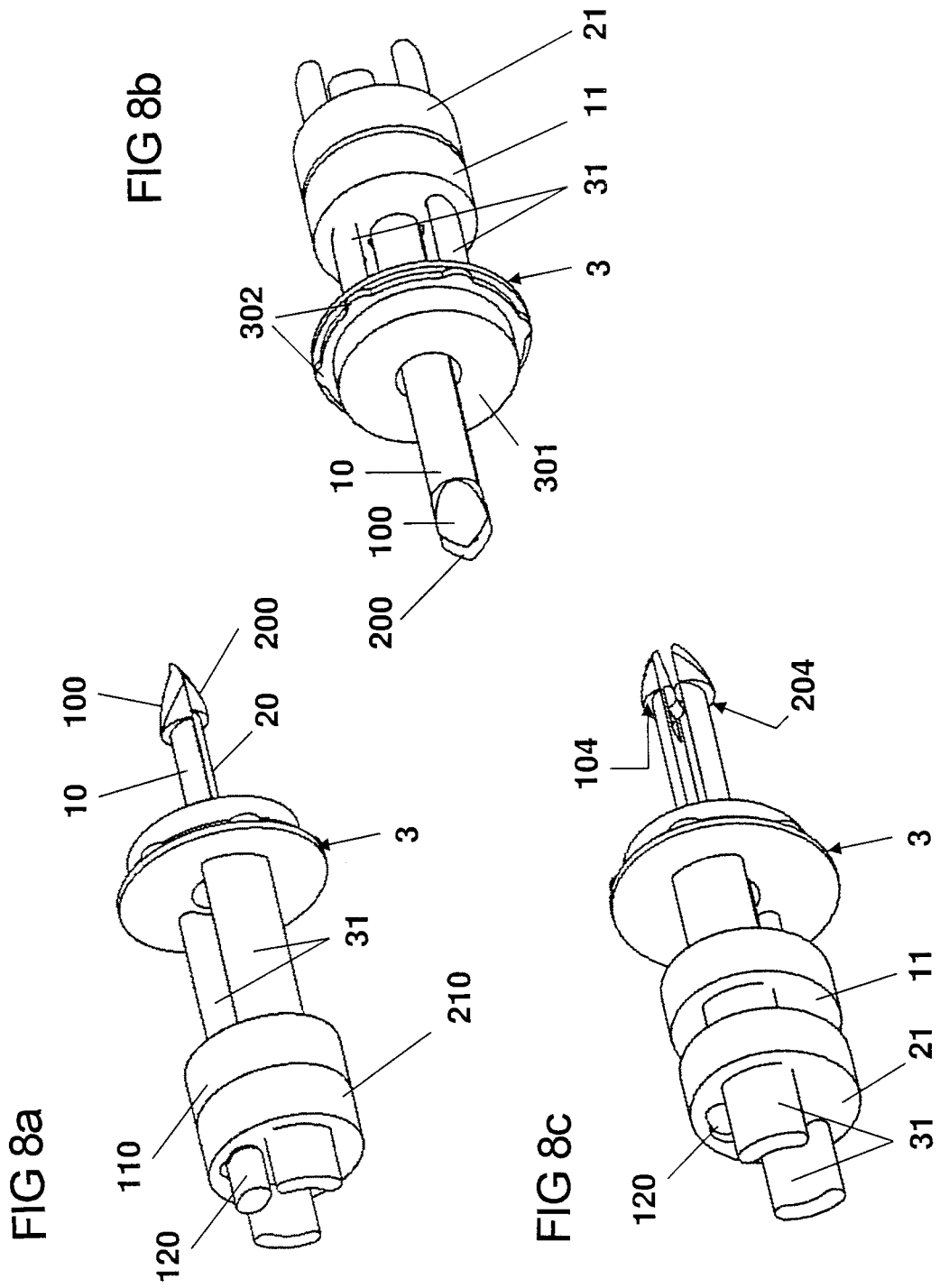

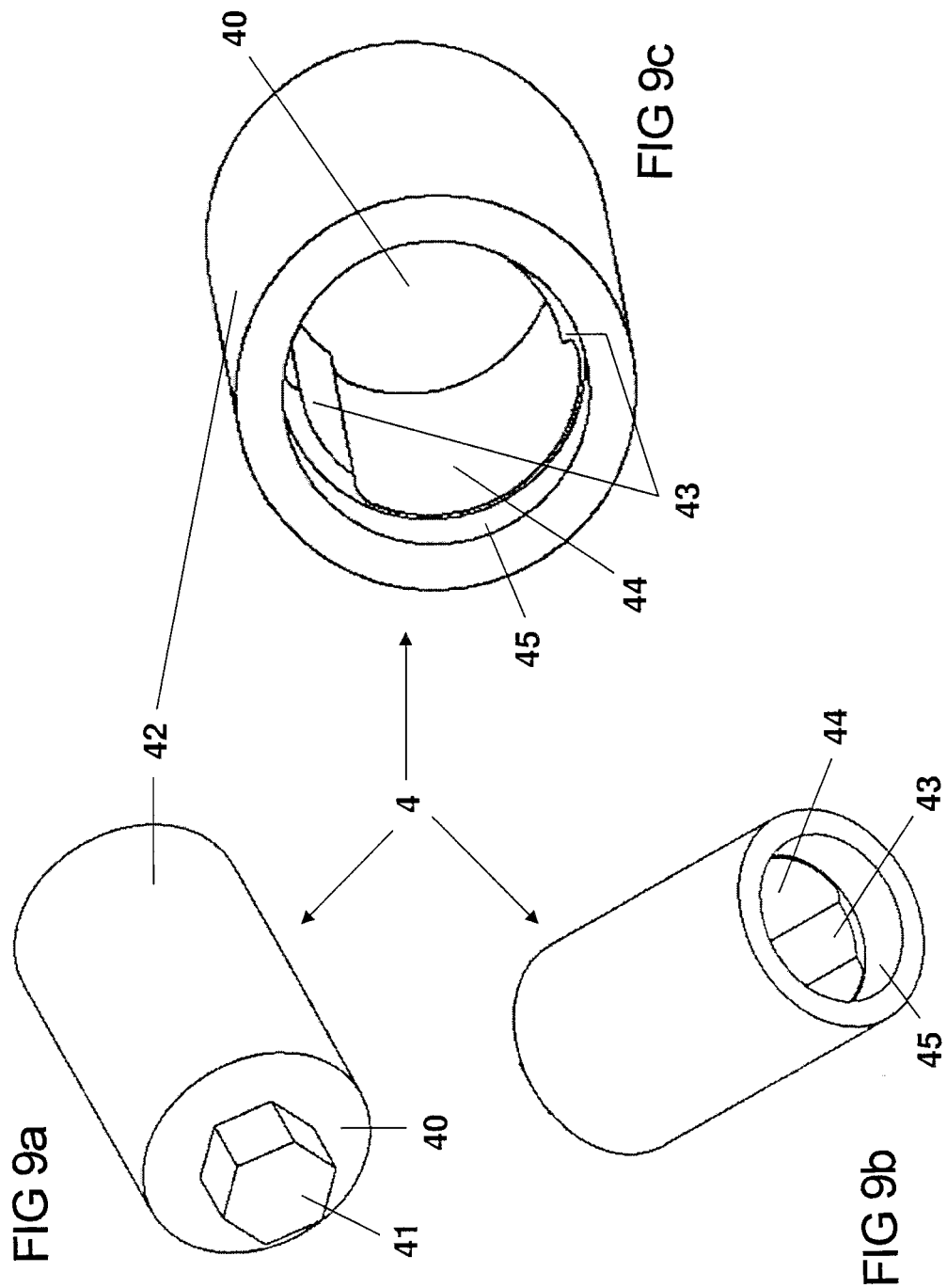

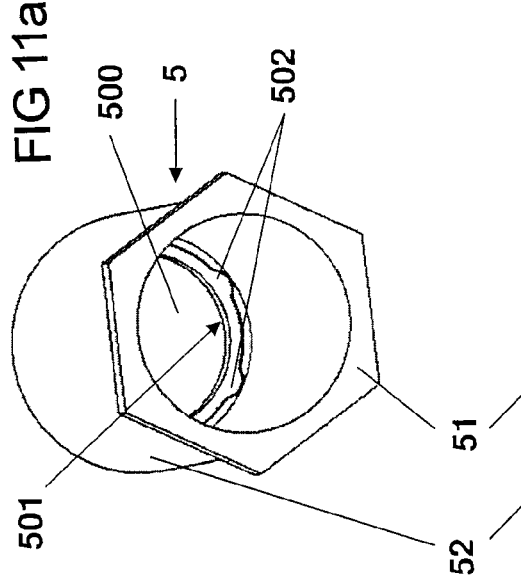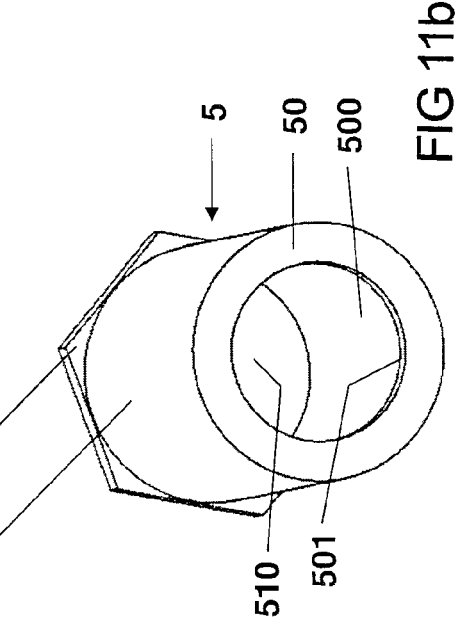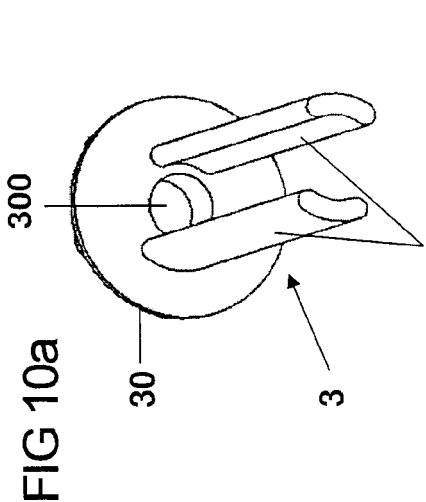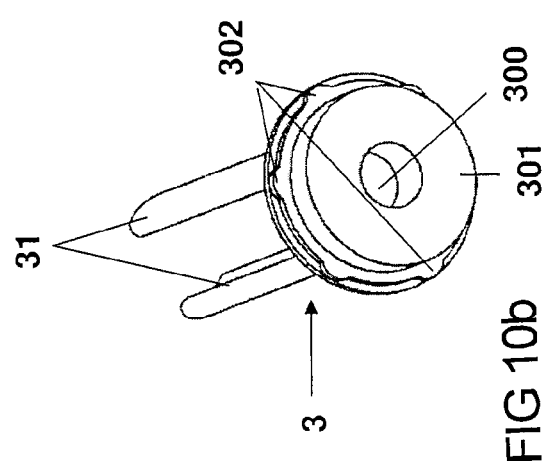

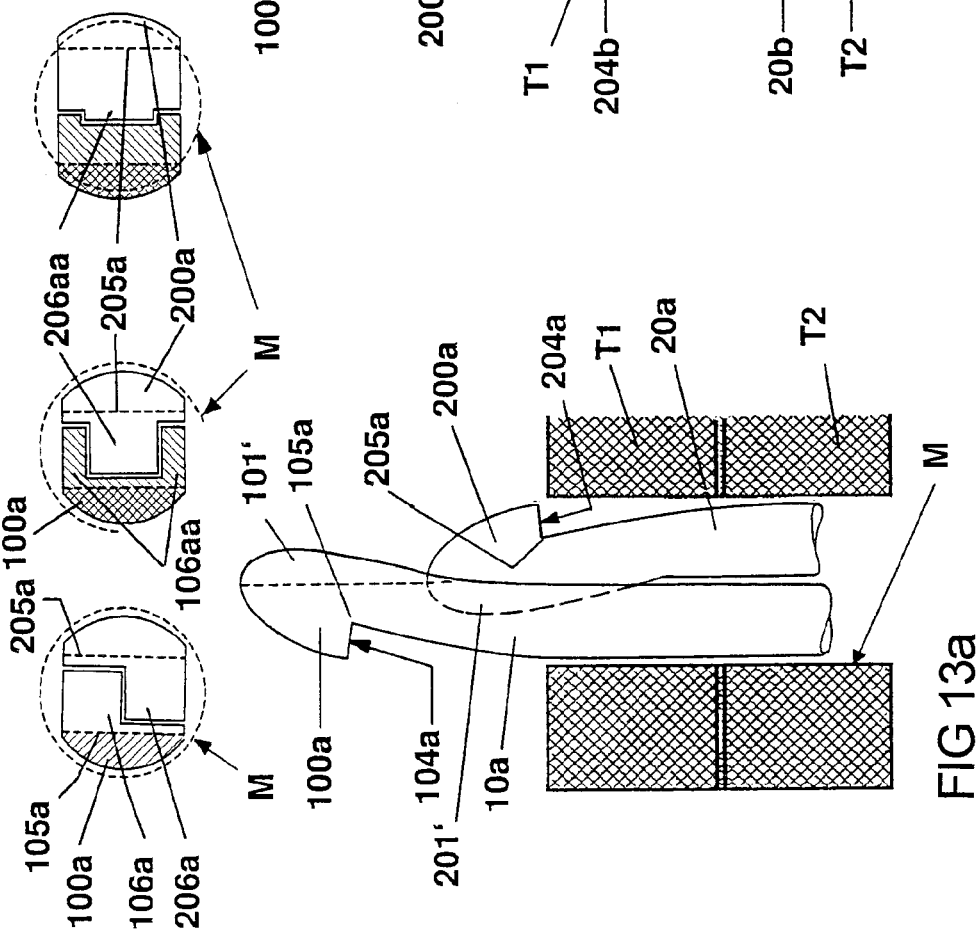

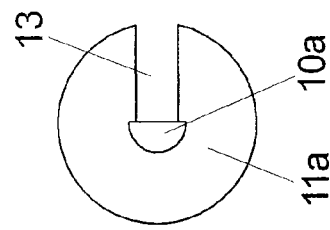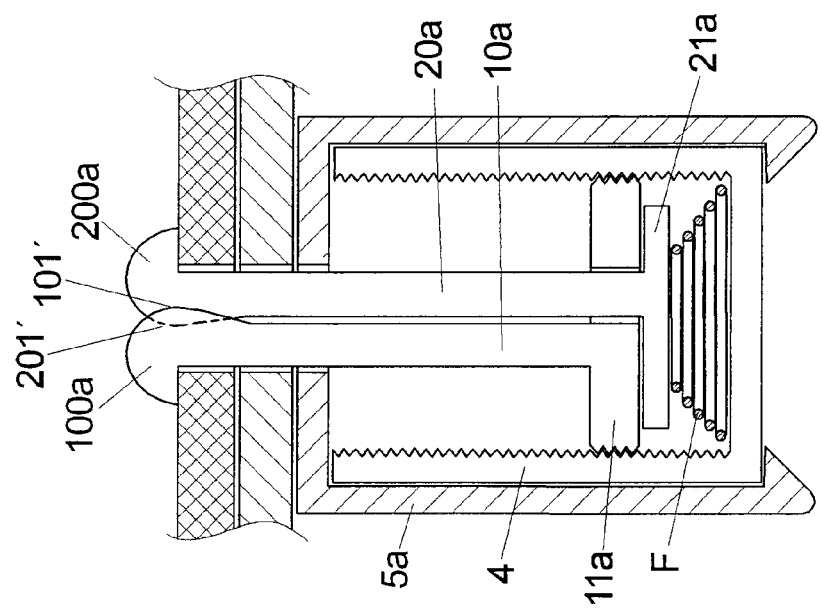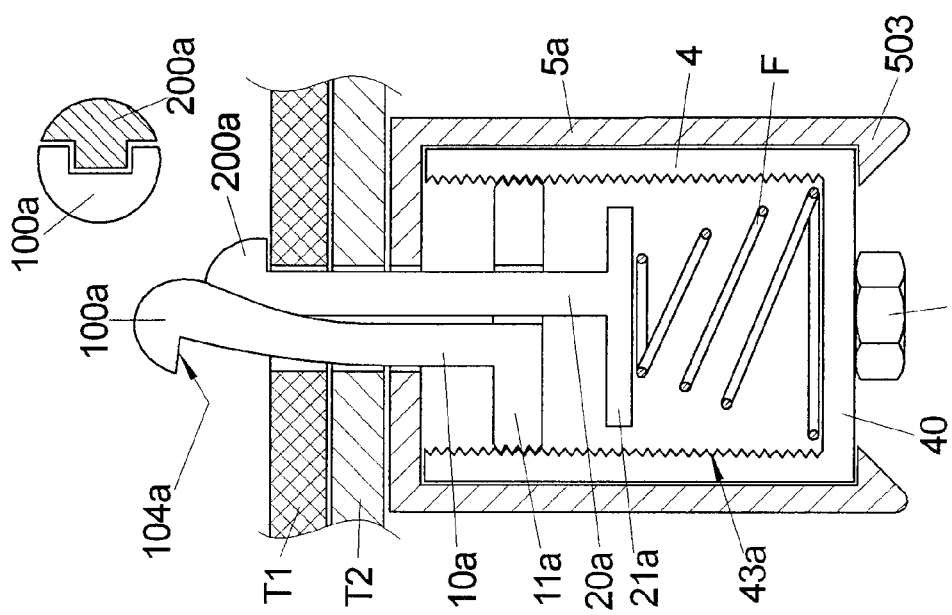

DEVICE FOR CONNECTING TWO PARTS AND NEEDLE SYSTEM FOR SUCH A DEVICE

CROSS-REFERENCE TO A RELATED APPLICATION

This application is a National Phase Patent Application of International Patent Application Number PCT/EP2012/063985, filed on Jul. 17, 2012, which claims priority of German Patent Application Number 10 2011 108 624.6, filed on Jul. 27, 2011.

BACKGROUND

The invention relates to a connecting device for temporarily connecting two preferably plate-like parts, in particular for connecting two parts to be glued and/or to be riveted. Furthermore, the invention relates to a needle for such connecting devices, which can guarantee a reduced area pressing at the parts to be connected. The preferred field of application of the invention is the aerospace sector.

A known connecting device of the principle according to the invention, which is used in the aviation industry, is described in DE 20 2010 015 746. It comprises a guiding body mounted torque-proof in a housing, the guiding elements thereof engage into guiding openings of the needle carrier. The needle carrier carries two needles distanced from each other with terminal sided hook-shaped needle tips. A spreading of the needle tips occurs if the needle tips projecting at first beyond the end of the spreading tongue connected to the guiding body are moved by the driving element axially into the housing. For this reason the needle carrier and the driving element comprise screw threads engaging into each other.

This connecting device has the disadvantage that the spreading tongue covers a note-worthy part of the hole cross section, which is provided for guiding the needles transferring the tensioning force. The spreading tongue itself can transfer a tensioning force. It is furthermore of a disadvantage that the length of the spreading tongue has to be adapted to the thickness of the parts to be tensed or to be connected.

SUMMARY

An object of the present invention is to develop an improved connecting device and a novel system of needles with hook-shaped abutments, which provides an enlarged abutment area of the needle tips at a predetermined diameter provided for the needles and thus can reduce the area pressing.

The essence of the connecting device according to an exemplary embodiment of the invention consists in the following feature combination:

The connecting device, which is based on a as such known combination of housing, hook-shaped abutment with integrated supporting areas at the free ends of the assigned needles and a drive element for axial adjustment of the needles as well as for spreading the hook-shaped needle tips, is essentially characterized by at least two needles, which are firmly connected on the base side to respective separate carriers, of which at least one carrier is operatively connected to the drive element such that the needles can be adjusted relative to each other in axial direction;

an axial movement of the needles in a starting position before the connecting device is tensed with the parts to be connected, and in fact with needle tips moved axially to each other, while in the tensed position the needle tips are opposite to one another such that the supporting areas thereof are situated at the same axial level;

integrated elevations and depressions in the area of the needle tips in respect to their areas facing each other, wherein said elevations and depressions are nested into each other in a space-saving manner in the starting position of the needles, and wherein the elevations slide on each other during the transition into the tensed position of the needle tips and thus press the needle tips apart from each other such that the supporting areas of the needle tips overlap the assigned area sections of the parts to be connected on the edge side of the assembly hole.

According to a preferred variant of the invention, a first needle-carrier-combination consisting of a first shorter needle, which is firmly connected to a first carrier, and a second needle-carrier-combination consisting of a second longer needle, which is firmly connected to a second carrier, are nested into each other, wherein the first carrier comprises a lateral free punch or a passage opening for the second larger needle adapted to the cross section of the needle such that the two carriers can be arranged axially one after the other and the two needles can be arranged preferably next to each other.

Guiding openings continuing in alignment in the two carriers in combination with guiding bodies of a support-guiding body-combination, wherein the guiding bodies are inserted into the carriers in a sliding movable manner, provide the anti-twist protection of both needle-carrier-combinations.

A further preferred feature of the invention is that the first carrier comprises a coupling element which can be inserted into a coupling opening of the second carrier. A limitation of the axial movability of the needles is guaranteed when interacting with a contact area arranged in the region of said coupling opening and a projection of the coupling element. In this contact position, the supporting areas of the needle tips are aligned to each other and are provided for tensing the parts to be connected.

At first, however, in the starting position of the needles not yet tensed, the first and the second carrier are arranged next to each other without a distance or with a small distance, wherein the supporting areas of the needle tips do not yet align to each other and are thus also not yet spread radially.

The carrier comprise a screw thread for axial adjustment of the carrier and the movement of the needles connected thereto, wherein said screw thread is operatively connected to an assigned internal screw thread of the drive element. The screw thread of the drive element is preferably formed as an internal thread arranged sectional in order to achieve a simple demoulding of a drive element injection molded of plastic.

A cylindrical area without a thread is arranged upstream of the screw thread at the open end of the sleeve-shaped drive element, the height thereof corresponds at least to the height of the first carrier. Thereby it is guaranteed that at first the second carrier with the longer needle is moved with its tip onto the axial level of the needle tip of the shorter needle. Only then both needle tips are adjusted synchronously until the connecting device is tensed with the parts to be tensed. The drive element is driven via a tool intersection at the bottom of the drive element, where a rotating tool can be positioned.

In an alternative embodiment a first carrier is provided with an external thread, which can be engaged with the internal thread of the drive, and a second carrier, which is preloaded by means of a spring element in direction of the first carrier arranged upstream. This variant has the advantage that no measures have to be provided in order to guarantee an engagement of the threads of the needle carriers into the thread of the drive part which is coordinated between the needle carriers.

The needles comprise preferably in the area of the needle tips projections and depressions, which engage alternating into each other, if the needle tips are moved axially to each other. Thereby, the needle tips cover a comparatively small cross section and almost completely fill out the assembly holes in the plane of the supporting areas of the needle tips. If the needle tips are located axially on the same level, thus the projections and depressions do not engage any longer with each other, but at least do not engage anymore completely into each other, the needle tips are pressed apart from each other by the projections resting on top of each other. As a consequence, the supporting areas of the hook-shaped abutments of the needle tips overlap the assigned areas of the parts to be connected.

A further invention relates to a novel needle system of the previously described connecting device. At least two needles, the tips thereof are formed as hook-shaped abutments, comprise at the areas facing each other a contour deviating from the axial moving plane, in particular in form of projections and depressions. They engage alternating into each other in a nested manner, if the needle tips are moved axially to each other. However, they do not engage or only partially engage with each other, if the needle tips are located axially on the same level. The needle tips are then pressed apart from each other by the projections resting on top of each other, whereby the supporting areas of the needle tips overlap the assigned areas of one of the parts to be connected.

The projections and depressions or the like are preferably integrated in one piece into the needles made of plastic or metal, in particular in the region of the needle tips. Plastic needles should be formed fiber-enforced in order to be able to absorb high mechanical loadings. Plastic needles can be, in a simple manner, integral part of the assigned carrier.

If the needles are made of a metallic material, for instance in form of a casting or a cold impact extrusion part, form-fit regions should be formed on the base side for a stable embedding of the needles into a carrier of plastic. The needles and the carrier can be made of course also as one piece metallic castings.

For minimizing the area pressing, the sum of the cross sections of all needle tips in the plane of their supporting areas should correspond approximately to the cross section of the assembly holes in the parts to be connected. It is recommended that the cross sections thereof cover in sum preferably more than 90% of the cross section of the assembly hole.

In a particular embodiment of the needles in the region of their tips the sum of the cross sections of all needle tips in the plane of their supporting areas can be larger than the cross section of the assembly holes in the parts to be connected. This is achieved by projections in the region of the needle tips, which are formed by the needle tips themselves by a curved course of the contour of the needles continuing opposite to the locking direction of the supporting areas. Thereby, the projections of the shorter needles engage into the assigned free spaces of the longer needles, while the projection of the longest needle overlaps the needle tips of the other needles.

The areas of the needles or needle tips facing each other comprise preferably guiding contours directed essentially axially and engaging form-fit into each other in order to guarantee a defined positioning of the needle tips during the adjustment process. For this reason the needle tips are connected elastically to the needle shafts.

BRIEF DESCRIPTION OF THE DRAWINGS

The invention is explained in the following by means of embodiments and the illustrated Figures.

FIGS. 1a, 1b show perspective views of a connecting device,

FIGS. 2a, 2b show explosion illustration of the singular parts of the connecting device, FIGS. 3a, 3b show perspective views of the first needle-carrier-combination with a passage opening for the second needle, FIGS. 4a, 4b show perspective views of the second needle-carrier-combination with a coupling opening for the passage of a coupling element of the first carrier, FIGS. 5a, 5b show perspective views of the two needle-carrier-combination with spread needle tips nested into each other, FIGS. 6a, 6b show perspective illustration of a carrier side view of the second needle-carrier-combination as well as an enlarged illustration of the coupling opening, FIGS. 7a, 7c show perspective views of the needle-carrier-combinations with non-spread needle tips nested into each other, FIG. 7b shows enlarged illustration of the needle tips moved to each other and nested into each other on the attachment side, FIGS. 8a-8c show perspective views of the needle-carrier-combinations nested into each other in combination with the support-guiding body-combination, wherein it shows:

FIG. 8a shows non-spread needle tips moved maximal to each other,

FIG. 8b shows needles with a beginning spreading of the needle tips partially moved to each other, FIG. 8c shows needle tips on the same height (not moved anymore to each other) and spread apart, FIGS. 9a-9c show different perspective views of the drive element acting onto the needle-carrier-combination, FIGS. 10a, 10b show perspective views of the supporting guiding body combination with form-fit elements to the external housing, FIGS. 11a, 11b show perspective views of the external housing, FIGS. 13a-13e, show principal illustration of different variants of needles nested into each other from the back side via form-fit regions, the tips thereof comprise in the region of their supporting area in sum a cross section, which is larger than the cross section of the assembly hole, FIG. 14 shows principle illustration of a variant of needles nested from the backside via a region reduced in its thickness, FIGS. 15a-15b show cross section of a connecting device with only one driven needle carrier and needles according to the principle illustrated in the FIGS. 13a to 13c, FIG. 15c shows top view of the contour of the driven needle carrier with its lateral free punch for introducing the other needle.

DETAILED DESCRIPTION

Figures 12A, 12B:
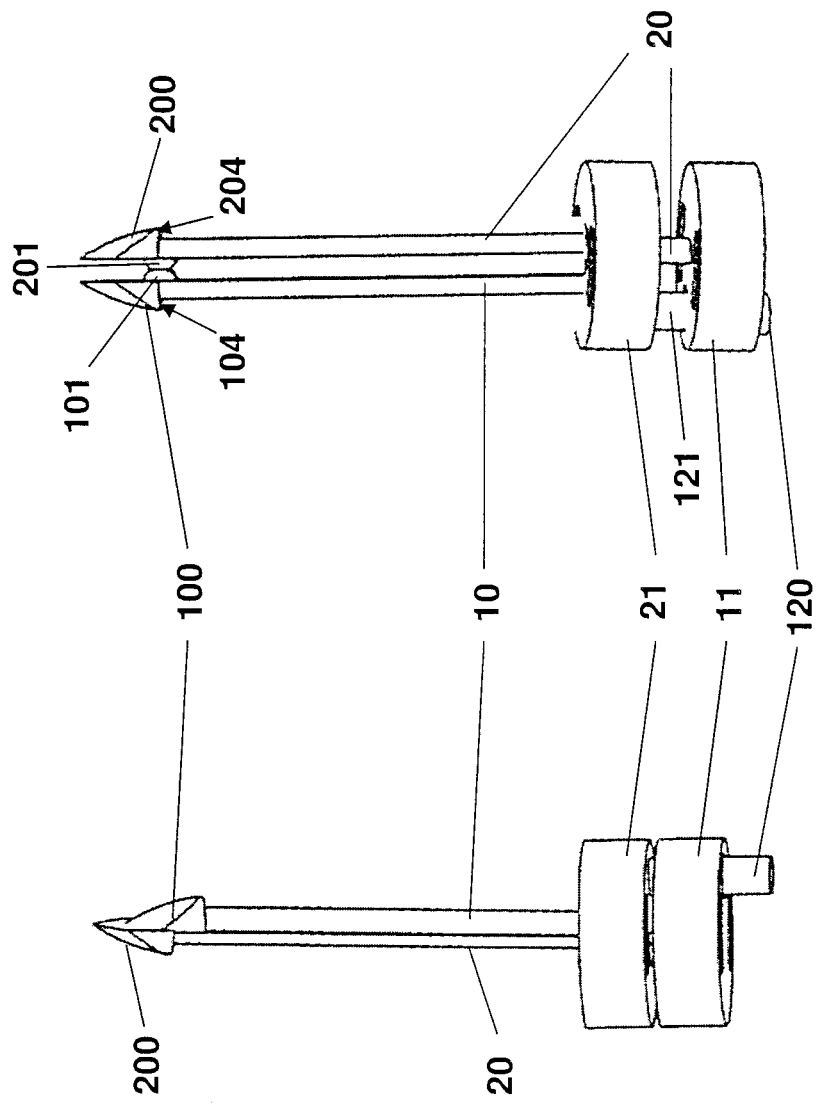
FIGS. 12a, 12b show side views of the needle-carrier-combination nested into each other with non-spread and spread needle tips.

The perspective views of the connecting device shown in FIGS. 1a and 1b illustrate two so-called sewing needles 10, 20 in a position in which a tensioning with the parts (not shown here) could occur. Thereby, the needle tips 100, 200 are on the same axial level in respect to the supporting area 301, which provides the contact to one of the parts to be connected. Should the supporting area 301 be contaminated by a glue then, by exchanging part 3 in a simple manner, the advantage of the modular system can be used and costs can be saved.

The housing 5 of the connecting device comprises on the opposite side a form-fit region 51, which serves in connection with the rotating tool as anti-twist protection, if the adjusting force is transferred via a second form-fit element 41. This second form-fit element 41 is shaped at the bottom 40 of the drive element 4 which is provided for adjusting the needles 10, 20 and tensing the needle tips 100, 200 to the in particular plate-like parts to be connected.

All parts of the connecting device are deducible from FIGS. 2a and 2b. Accordingly, a first needle-carrier-combination 1 is provided, which consists of a needle 10 and a carrier 11, wherein both are firmly connected to each other. The needle 10 comprises a circular sectional cross section, which—as far as possible—should be approximately a semicircle in order to use the available space as good as possible and thus to maximize the carrying capacity thereof. On the essentially flat side of the needle 10 a passage opening is formed in the carrier 11 through which the needle 20 of the second needle-carrier-combination 2 can be guided.

Both carriers 11, 21 comprise screw threads 110, 210 at their cylindrical external faces for the purpose of engaging into assigned thread segments 43 of the drive element 4. Furthermore, aligned guiding openings 112, 212 of both carriers 11, 21 form in connection with the inserted guiding bodies 31 of the support-guiding body-combination 3 an anti-twist protection for the needles 10, 20. Thereby, the needles 10, 20 pass the opening 300 of the supporting body 30. The supporting body 30 comprises on the one hand form-fit elements 302, which form in connection with assigned form-fit elements 502 of the housing 5 (see FIG. 11A) a further anti-twist protection.

The assembly of parts 1 to 5 is to be carried out in the following order:

At first, the first and the second needle-carrier-combination 1, 2 are nested with each other by inserting the second needle 20 into the passage opening 111, and indeed until both carriers 11, 21 rest on top of each other. In this status, the end of the second needle tip 200 projects somewhat beyond the end of the first needle tip 10, wherein the protrusions 101, 201 and depressions 102, 202 incorporated into the flat sides of the needles 10, 20 engage into each other in a space saving manner. Thereby, the needle tips 100, 200 are essentially directly adjacent to each other with their flat sides and comprise the smallest radial extension.

The needle-carrier-combinations 1, 2 joint such are now nested with the support-guiding body-combination 3 by inserting the needles 10, 20 from the side of the guiding body 31 through the opening 300 of the supporting body 30 until the carrier 11 rests against the supporting body 30. Thereby, the guiding bodies 31 reach through the guiding openings 112, 212 and form an anti-twist protection in order to be able to guarantee the drive force for adjusting the needles 10, 20 by means of the rotatable drive element 4.

In the next step, the combination of parts 1, 2 and 3 is inserted into the drive element 4, wherein the carrier 21 abuts at first against the first thread of the internal thread segment 43 and fills out largely the cylindrical space 45 (which does not comprise a thread). Due to a screwing movement the external thread 210 of the carrier is brought into engagement with the internal thread 43 of the drive, and indeed until the first carrier 11 is completely received by the space of the cylindrical face 45. In this status, the supporting body 30 rests on the outer edge of the drive element.

Finally, the combination of the parts 1, 2, 3 and 4 is inserted from the side of the form-fit region 51 into the opening 510 of the housing 5 until the supporting area 301 projects through the front-sided opening 500, wherein the supporting body 30 of the support-guiding body-combination 3 engages with its form-fit elements 302 in assigned form-fit elements 502 (see FIG. 11A) and forms an anti-twist protection. A protection not illustrated in the FIGS. 2a, 2b shall guarantee that the axial position of the drive element 4 is maintained in the housing 5.

FIG. 3a, 3b or 4a, 4b show a possible embodiment of needle-carrier-combinations 1 and 2, the assembly thereof is illustrated in different axial positions of their elements in the FIGS. 5a to 7c.

Accordingly, the needle tips 100, 200 of the needles 10, 20 comprise at their sides directed outwards conical or cone-sector shaped formed areas 102, 203 which lead to radial continuing supporting areas 104, 204. On the sides of the needles 10, 20 directed inwards (which are formed essentially flat) projections 101, 201 and depressions 102, 202 are incorporated in the region of the needle tips 100, 200 or in close proximity thereto, which engage alternating into each other in a starting position of needles 10, 20 such that the needle tips 100, 200 adjoin each other at their sides directed inwards. See also FIGS. 7a to 7c. In this this position, the needle tips 100, 200 occupy the smallest radial cross section, which is somewhat smaller than the cross section of the assembly holes M of the parts to be connected. Thereby, the carriers 11, 21 rest on top of each other and the second needle tip 200 projects somewhat beyond the first needle tip 100.

Furthermore, means are provided which delimit a relative movement of the needles 10, 20 or their needle tips 100, 200 such that the supporting areas 104, 204 thereof can be displaced exactly on the same axial level, wherein the projections 101, 201 slide on each other and spread thereby the needle tips 100, 200 apart. Only then, a tensing of the parts to be connected can occur.

For controlling the relative movement of the needles 10, 20 a coupling element 12 with a coupling region 120 forming a projection is provided at the carrier 11, which can engage into a coupling opening 211. The coupling opening 211 comprises according to the detailed illustration of the FIGS. 6a, 6b a round hole 211a being sufficiently wide for the passage of the coupling element 12, which is followed by a blind hole 211b with a contact area 211c in circumferential direction. In the already described starting position of the needles 10, 20 shifted to each other according to FIGS. 7a to 7c the coupling element 12, 120 projects the furthest through the coupling opening 211. If the coupling region 120 of the coupling element 12 reaching behind comes into engagement with the contact area 211c due to an axial drive movement of the second carrier 21 the first carrier 11 is taken along and its external thread 100 is picked up by the internal thread 42 of the drive element 4. This contact position, in which the needle tips 100, 200 are spread apart, is shown in FIGS. 5a, 5b.

It has to be mentioned at this point that—in contrast to the simplified illustration in the FIGS.—the needles 10, 20 are progressively less spread apart when spreading their needle tips 100, 200 in direction to their fastening to the carriers 11, 21. With this in mind, the side views of the FIGS. 12a, 12b are also to be seen as schematic illustrations, which show the needles 10, 20 and the carrier 11, 21 in their starting position as well as in their functional position (thus with needle tips 100, 200 spread apart).

FIG. 8a shows the starting position with needle tips 100, 200 moved against each other, which are nested with each other in a space-saving manner, wherein the carriers 11, 21 rest on top of each other and the guiding bodies 31 formed at the supporting body 31 are inserted with a certain length into the guiding openings 112, 212. According to FIG. 8b a slight relative movement between the needles 10, 20 or the needle tips 100, 200 took place what can be recognized by means of the small gap between the carriers 11, 21. The maximum movement between the needles 10, 20 is shown in FIG. 8c. Here, the axial aligned contact areas 104, 204 are located on the same level. Simultaneously, the projections of the needle tips 100, 200 standing on top of each other are spread apart at a maximum. The carriers 11, 21 have now the maximum distance, which is delimited by the already described coupling opening 2011 and the coupling element 12, 120.

In order to prevent an undesired early engagement of the thread 43 of a drive element 4 into the thread 110 of the first carrier 11 it is recommended to provide the engagement between the guiding bodies 31 and the guiding openings 112 with sufficient friction. As an alternative, a compression spring can also be installed for this reason between the carriers 12, 21, wherein said compression spring can be eventually a single piece part of a carrier 11, 21 made by injection moulding.

FIGS. 9a to 9c show the sleeve-shaped drive element 4 which has already been described in principle in context with the FIGS. 2a, 2b, enlarged in different views. It is of an advantage to produce this element out of plastic, wherein the internal thread 43 is not continuously formed but segment-like alternating to threadless free punches 44 in order to be able to guarantee in a simple manner a demoulding of a slider of an injection moulding tool. Otherwise, this part of the injection moulding tool must be elaborately unscrewed. The threadless cylindrical front region 45 of the drive element 4 serves for receiving the first carrier 11 in the starting position of the parts of the connecting device. A hexagon form-fit element 41 is provided at the rear bottom 40 for the engagement of a rotating tool.

The contrasting of the support-guiding body-combination 3 of FIGS. 10a, 10a and the housing of FIGS. 11a, 11b shall clarify the form-fit engagement of the supporting body 3 with its form-fit elements 302 into the assigned form-fit regions 502 in proximity of the edge 501 of the opening 500 in the housing 5. The supporting area 301 of the supporting body 30 projects through the opening 500 and overlaps the front side area 50 of the housing 5.

Another variant of needles 10a, 20a according to the invention is illustrated in FIGS. 13a-13c. The needles 10a, 20a are inserted into the concentric assembly holes M of the parts T1, T2 to be connected, wherein the needle tips 100a, 200a project with their supporting areas 104a, 204a beyond the upper edge of part 1. The sides of the needles 10a, 20a facing each other and directed inwards are nested with each other according to the notch-spring principle as shown exemplarily in the FIG. 13b or 13c and 13d. In the illustrated starting position of FIG. 13a the needle tip 200a of the shorter needle 20a is inserted on the back side partially "within" the longer needle 10a. The region characterized by the dotted line shall mark the projection 201' which engages into an adaptable contour of the other needle 10a. In case of a relative movement of the two needles 10a, 20a, which brings the supporting areas 104a, 204a to the same axial level, the contours of the projections 101', 201' run onto each other and pivot the supporting areas 104a, 204a over the edge area of the assembly hole M of part T1.

The special feature of this embodiment is that the sum of the cross sections of the needle tips 100a, 200a in the plane of their supporting areas 104a, 204a is larger than the cross section of the assembly hole M. In the embodiment shown according to FIG. 13c the guiding contours 106aa and 206aa engaging into each other form-fitted form a notch-spring system, and indeed according to the starting position of the needle tips 100a, 200a shown in FIG. 13a. When moving the needles 10a, 20a the depth of engagement of the guiding contours 106aa forming the notch and the guiding contours 206aa forming the spring change as illustrated in FIG. 13d. As a consequence, the needle tips 100a, 200a are pressed apart such that the supporting areas 104a, 204a overlap the edges of the assembly hole M. As soon as the supporting areas 104a, 204a have reached the same axial level the provided loading force can be transferred to the parts T1, T2 to be connected by rotating the drive element 4.

FIG. 13e shows a further variant of guiding contours of the notch-spring principle. The contours interlocking wedge-shaped represent the starting position of the needles in analogy to the FIGS. 13a and 13c, thus with needle tips 100a, 200a moved towards each other. This wedge-shaped contour has the advantage that it is less susceptible to tolerances and is always guided centrically. The corner edges 105a, 205a of the supporting areas 104a, 204a are formed in circular section curved in this embodiment and approach thus the contour of the assembly hole M. Hereby, the size of the supporting areas 104a, 204a is maximized and the area pressure is minimized.

The variant illustrated in FIG. 13b of an L-shaped cross section of back-sided contours of the needles 10a, 20a in the region of their tips has the advantage that one can manage with only one variant of needles.

A variant of the previously described embodiment principle of FIG. 14 which is developed extremely further to a certain extend is shown in FIG. 14. Here, the so called depression 102' in the longer needle 10b is provided by a material reduction, in which a considerable part of the head (analogue to projection 201') of the needle tip 200b is placed. For this embodiment a sufficient pivotability of the needle tips 100b, 200b has to be guaranteed. When using plastic as material for the needles 100b, 200b the mechanical loading capacity should be improved by incorporating longitudinal fibers (preferably made of aramid or similar materials).

Finally, it still should be pointed to a variant of a connecting device (see FIGS. 15a to 15c) in which only the carrier 11a of the needle 10a projecting the furthest is directly driven via an external thread, which is in engagement with the internal thread 43 a of the drive element. The carrier 21a of the other needle 20a is indeed pressed upwards by a spring F. However, the needle tips 100a, 200a are in engagement with each other elastically preloaded in radial direction such that these needle tips 100a, 200a can only then reach the same axial level with their supporting areas 104a, 204a if the needle tip 200a is already in engagement with the part T1 to be tensed and the carrier 11a is further adjusted until it comes finally into abutment with the second carrier 21a. When further actuating the drive element 4 the provided tension force is built up. See also the principle illustration of FIG. 15b, where the tensing of the parts T1, T2 to be connected occurs only after a longer adjustment path with mostly compressed spring F.

FIG. 15c shows schematically the top view onto the carrier 11a, which comprises a free punch 13 aligned radially, through which the other needle 20a can be inserted sideways in order to join together the two needle-carrier-combinations.

LIST OF REFERENCE SIGNS

1 needle-carrier-combination
10, 10a, 10b needle
11, 11a carrier with external thread
12 coupling element
13 free punch
100, 100a, 100b needle tip/hook-shaped abutment
101, 101' projection
102, 102' depression 103 conically continuing area
104, 104a, 104b holding area/supporting area
105a corner edge of the supporting area
106a, 106aa guiding contour/form-fit element
110 thread
111 passage opening
112 guiding opening
120 coupling region (overlapping)
121 connecting region
2 needle-carrier-combination
20, 20a, 20b needle
21, 21 a carrier with external threat
200, 200a, 200b needle tip/hook-shaped abutment
201, 201' projection
202 depression
203 conically continuing area
204, 204a, 204b holding area/supporting area
205a corner edge of the supporting area
206a, 206aa guiding contour/form-fit element
210 thread
211 coupling opening
211a round hole
211b pocket hole
211c contact area
212 guiding opening
3 support-guiding body-combination
30 supporting body
31 guiding body
300 opening
301 supporting area
302 form-fit elements
4 drive element/thread sleeve
40 bottom
41 tool interface/form-fit element/hexagon element
42 cylindrical external area of the thread sleeve
43, 43a internal thread segment
44 free punch (for deforming the slider of an injection tool)
45 cylindrical area without thread
5 housing
50 front side area 50
51 form-fit region
52 external wall
500 opening, front side
501 edge of the opening 500
502 form-fit region
503 latching element
510 opening
F spring
M assembly hole
T1 part 1
T2 part 2

The invention claimed is:

1. A device to connect two parts, the device comprising:
a supporting area connected directly or indirectly to a housing of the device to support at one of the parts to be connected;
supporting areas at least two abutments to support at the other of the parts to be connected, wherein the supporting areas of the abutments form an end of assigned needles;
a system to axially adjust the supporting areas of the adjustable abutments and for a displacement thereof orthogonal to an axial adjustment direction in order to engage with the supporting areas of the abutments in the other of the parts to be connected, after the abutments have reached through the overlapping openings of the parts to be connected;
a drive element for axially adjusting the needles; and
a first needle-carrier comprising of a first shorter needle, which is connected to a first carrier, and
a second needle-carrier comprising of a second longer needle, which is connected to a second carrier;
wherein the first carrier comprises a free punch or a passage opening for the second longer needle such that the first carrier and the second carrier can be arranged axially one after the other and the needles are configured to be arranged next to each other,
wherein at least two of the needles belonging to the device are connected on a base side to separate carriers, of which at least one carrier is operatively connected to the drive element such that the drive element is suitable to adjust the needles relative to each other in axial direction,
wherein in a starting position of the needles before bracing the parts to be connected, the tips of the needles are to be moved axially to each other and that in a bracing position the tips of the needles are opposite to one another in such a way that the supporting areas thereof are situated at the same axial level,
wherein the needles have in a region of their tips relative to their mutually facing areas integrated elevations and depressions, wherein said elevations and depressions are nested into each other in a space saving manner in the starting position of the needles, and wherein the elevations support each other in the bracing position of the tips of the needles such that the supporting areas are configured to be adjusted orthogonally to the axial adjustment direction of the needles.

2. The device according to claim 1, wherein the carrier comprises guiding openings continuing in alignment, into which guiding bodies of a support-guiding body-combination can be inserted for the purpose of anti-twist protection.

3. The device according to claim 1, wherein the first carrier comprises a coupling element, which can be inserted into a coupling opening of the second carrier and forms a limitation of the axial movability of the needles when interacting with a contact area arranged in the region of the coupling opening such that the supporting areas of the needle tips are aligned to each other.

4. The device according to claim 1, wherein the first and the second carrier can be arranged next to each other, wherein the supporting areas of the needle tips do not align to each other.

5. The device according to claim 1, wherein for axial adjustability of the carrier and the needles connected thereto, the carrier comprises a screw thread, which is operatively connected to an assigned screw thread of the drive element.

6. The device according to claim 5, wherein the screw thread of the drive element is formed as internal thread sections arranged sectionally.

7. The device according to claim 1, wherein a cylindrical area without a thread is arranged upstream to a screw thread at an open end of a sleeve shaped drive element, which comprises at least such a height which corresponds to the height of the first carrier.

8. The device according to claim 1, wherein at a bottom of the drive element a tool intersection for engaging a rotating tool is provided.

9. The device according to claim 1, wherein the first carrier is provided with an external thread, which can be engaged with the internal thread of the drive, and that the second carrier is preloaded by a spring element in direction of the first carrier arranged upstream.

10. A system of a device for connecting at least two parts, the system comprising:

a supporting area connected directly or indirectly to a housing of the device to support at one of the parts to be connected;
supporting areas at least two abutments to support at the other of the parts to be connected, wherein the supporting areas of the abutments form an end of assigned needles;
a system to axially adjust the supporting areas of the adjustable abutments and for a displacement thereof orthogonal to an axial adjustment direction in order to engage with the supporting areas of the abutments in the other of the parts to be connected, after the abutments have reached through the overlapping openings of the parts to be connected;
a drive element for axially adjusting the needles,
wherein at least two of the needles belonging to the device are connected on a base side to separate carriers, of which at least one carrier is operatively connected to the drive element such that the drive element is suitable to adjust the needles relative to each other in axial direction,
wherein in a starting position of the needles before bracing the parts to be connected, the tips of the needles are to be moved axially to each other and that in a bracing position the tips of the needles are opposite to one another in such a way that the supporting areas thereof are situated at the same axial level,
wherein the needles have in a region of their tips relative to their mutually facing areas integrated elevations and depressions, wherein said elevations and depressions are nested into each other in a space saving manner in the starting position of the needles, and wherein the elevations support each other in the bracing position of the tips of the needles such that the supporting areas are configured to be adjusted orthogonally to the axial adjustment direction of the needles,
wherein at least two of the areas of the needles facing each other comprise a contour deviating from an axial moving plane, in particular in form of projections and depressions,
which are nested alternating engaging into each other, if the needle tips are moved axially to each other, and
which do not engage or only partially engage into each other if the needle tips are arranged axially on the same level such that the needle tips are pressed apart from each other by the projections resting on top of each other, whereby the supporting areas of the needle tips overlap an assigned area of one of the parts to be connected.

11. The needle system according to claim 10, wherein the projections and depressions or the like are integrated in one piece into the needles, in particular in the region of the needle tips.

12. The needle system according to claim 10, wherein the needles are made of plastic.

13. The needle system according to claim 12, wherein the needles are an integral part of assigned carrier.

14. The needle system according to claim 10, wherein the needles are made of a metallic material.

15. The needle system according to claim 14, wherein the metallic needles comprise on the base side form fitted regions for stable embedding into a carrier of plastic.

16. The needle system according to claim 14, wherein the needles and the carriers are made as single piece metallic castings.

17. The needle system according to claim 10, wherein a sum of the cross sections of all tips of the needles corresponds in a plane of their supporting areas approximately to the cross section of the assembly holes in the parts to be connected is more than 90% of said cross section.

18. The needle system according to claim 10, wherein a sum of the cross sections of all tips of the needles in a plane of their supporting areas is larger than the cross section of the assembly holes in the parts to be connected.

19. The needle system according to claim 18, wherein the projections of the needle tips are formed by the needle tips themselves by a curved contour of the needles continuing opposite to a locking direction of the supporting areas; wherein the projections of the shorter needles engage into assigned free spaces of the longer needles while the projection of the longest needle overlaps the needle tips of the other needles.

20. The needle system according to claim 10, wherein the areas of the needles or the needle tips facing each other comprise essentially axially directed guiding contours engaging form-fitted into each other in order to guarantee a defined positioning of the needle tips.

21. The needle system according to claim 10, wherein the needle tips are connected elastically to the needle shafts.

22. A device to connect two parts, the device comprising:
a supporting area connected directly or indirectly to a housing of the device to support at one of the parts to be connected;
supporting areas at least two abutments to support at the other of the parts to be connected, wherein the supporting areas of the abutments form an end of assigned needles;
a system to axially adjust the supporting areas of the adjustable abutments and for a displacement thereof orthogonal to an axial adjustment direction in order to engage with the supporting areas of the abutments in the other of the parts to be connected, after the abutments have reached through the overlapping openings of the parts to be connected;
a drive element for axially adjusting the needles;
an anti-twist protection between the housing and the support-guiding body-combination is provided, in particular guaranteed by form lock elements formed thereon, which engage into assigned form lock elements of the housing;
wherein at least two of the needles belonging to the device are connected on a base side to separate carriers, of which at least one carrier is operatively connected to the drive element such that the drive element is suitable to adjust the needles relative to each other in axial direction,
wherein the at least one of the separate carriers includes an opening for a first needle such that the separate carriers can be arranged axially one after the other and the at least two of the needles are configured to be arranged with respect to each other,
wherein in a starting position of the needles before bracing the parts to be connected, the tips of the needles are to be moved axially to each other and that in a bracing position the tips of the needles are opposite to one another in such a way that the supporting areas thereof are situated at the same axial level,
wherein the needles have in a region of their tips relative to their mutually facing areas integrated elevations and depressions, wherein said elevations and depressions are nested into each other in a space saving manner in the starting position of the needles, and wherein the elevations support each other in the bracing position of the tips of the needles such that the supporting areas are configured to be adjusted orthogonally to the axial adjustment direction of the needles.

23. A device to connect two parts, the device comprising:
a supporting area connected directly or indirectly to a housing of the device to support at one of the parts to be connected;
supporting areas at least two abutments to support at the other of the parts to be connected, wherein the supporting areas of the abutments form an end of assigned needles;
a system to axially adjust the supporting areas of the adjustable abutments and for a displacement thereof orthogonal to an axial adjustment direction in order to engage with the supporting areas of the abutments in the other of the parts to be connected, after the abutments have reached through the overlapping openings of the parts to be connected; and
a drive element for axially adjusting the needles,
wherein at least two of the needles belonging to the device are connected on a base side to separate carriers, of which at least one carrier is operatively connected to the drive element such that the drive element is suitable to adjust the needles relative to each other in axial direction,
wherein in a starting position of the needles before bracing the parts to be connected, the tips of the needles are to be moved axially to each other and that in a bracing position the tips of the needles are opposite to one another in such a way that the supporting areas thereof are situated at the same axial level,
wherein the needles have in a region of their tips relative to their mutually facing areas integrated elevations and depressions, wherein said elevations and depressions are nested into each other in a space saving manner in the starting position of the needles, and wherein the elevations support each other in the bracing position of the tips of the needles such that the supporting areas are configured to be adjusted orthogonally to the axial adjustment direction of the needles, and
wherein the needles comprise projections and depressions, which engage into each other alternating, if the tips of the needles are moved axially to each other, and which do not engage alternating into each other, if the tips of the needles are arranged axially on the same level, such that the tips of the needles are pressed apart from each other by the projections resting on top of each other.

* * * * *